United States Patent

Ojima et al.

[11] Patent Number: 5,201,810
[45] Date of Patent: Apr. 13, 1993

[54] ROLLER SHADE FOR AN OPENING HAVING A CURVED FRAME

[75] Inventors: Juji Ojima; Ken Suzuki, both of Kanagawa, Japan

[73] Assignee: NHK Spring Co., Ltd., Yokohama, Japan

[21] Appl. No.: 886,734

[22] Filed: May 21, 1992

[30] Foreign Application Priority Data

May 23, 1991 [JP] Japan .................................. 3-147830

[51] Int. Cl.[5] .............................................. E06B 9/20
[52] U.S. Cl. .................... 160/265; 160/370.2
[58] Field of Search ...................... 160/265, 370.2, 310, 160/262, 23.1, 311, 312, 274, 280, 290.1; 296/97.7, 97.8, 97.4, 37.16

[56] References Cited

U.S. PATENT DOCUMENTS

| | | |
|---|---|---|
| 735,562 | 8/1903 | Murphey . |
| 783,587 | 2/1905 | Nicewaner . |
| 916,389 | 3/1909 | Cowell . |
| 1,291,389 | 1/1919 | Brixey . |
| 1,777,545 | 10/1930 | Bergman . |
| 3,061,006 | 10/1962 | Hazlett .............................. 160/265 |
| 4,341,253 | 7/1982 | Eyerle ............................... 160/133 |
| 4,758,041 | 7/1988 | Labeur ............................... 296/97 G |
| 4,818,007 | 4/1989 | Mahoney ........................... 296/24.1 |
| 4,836,263 | 6/1989 | Ament ............................... 160/370.2 X |
| 4,898,224 | 2/1990 | Woodworth ........................ 160/310 |
| 4,979,775 | 12/1990 | Klose .................................. 296/97.1 |
| 5,033,527 | 7/1991 | Ouvrard et al. ................ 160/265 X |
| 5,067,546 | 11/1991 | Jeuffray et al. ............... 160/370.2 X |
| 5,139,075 | 8/1992 | Desrochers ...................... 160/265 X |

Primary Examiner—David M. Purol
Attorney, Agent, or Firm—Baker & Daniels

[57] ABSTRACT

In a roller shade for an opening such as a rear windshield of an automobile, when the shade is full closed, the pull rod is intentionally bent so as to fully conform to the peripheral edge of the opening. The bending of the pull rod can be achieved either by an axial force which may be produced by gradually reducing the distance between a pair of guide members extending on either lateral side of the opening as the pull rod moves up or by a lateral force which may be produced by placing a slope on which the pull rod rides over as it reaches its final position for fully covering the opening. By controlling the bent shape of the pull rod in a suitable manner, it is possible to entirely cover the opening without leaving any uncovered gap.

9 Claims, 16 Drawing Sheets

ROLLER SHADE FOR AN OPENING HAVING A CURVED FRAME

TECHNICAL FIELD

The present invention relates to a roller shade which may be used as a screen on windshields, windows and other forms of opening, and as a partition between a passenger compartment and a luggage compartment of a vehicle, and in particular to a roller shade which is suitable for use with an opening having a curved border or frame.

BACKGROUND OF THE INVENTION

Windows and windshields for vehicles such as road vehicles, air craft, and ships, and buildings such as homes, public buildings and garages are often provided with roller shades for the purpose of shielding the sunbeam and/or preventing the view from outside. Also, a cover may be provided between the passenger compartment and the luggage compartment of a vehicle as a partition. Covering the luggage compartment of a vehicle is preferable to the end of discouraging theft.

A typical roller shade comprises a spring-loaded retractor attached to a lower end of an opening such as a rear windshield, an opague or semi-transparent screen sheet having a trailing edge attached to the retractor, and a rigid rod member attached to the leading edge of the screen sheet and guided for a translational vertical movement. The screen sheet is normally wound around the retractor, and can be paid out from the retractor by pulling out the rod member away from the retractor. Typically, the rod member may be hooked or otherwise secured to an upper end of the opening with the screen sheet in its fully extended condition. When exposing the opening, the screen sheet is retraced and wound around the retractor by a spring incorporated therein.

In copending patent application Ser. No. 07/703/177 filed May 20, 1991 and claiming the Conventional priority data of May 23, 1990, it is proposed to use a screen sheet having a non-rectangular shape to cover a window or opening having a corresponding shape, and incorporate a telescopic structure to the pull rod to accommodate it to the changing width of the window as the pull rod is moved vertically. The contents of this copending application is incorporated herein by reference.

Modern car design requires streamlined vehicle bodies from aerodyamic as well as aesthetic view points, and such vehicle body design in turn requires three-dimensionally curved borders for windows on the exterior of the vehicle and areas for dividing a luggage compartment from a passenger compartment.

When such a window having a curved border or a curved window frame is to be covered by a conformal screen sheet, the rigid pull rod is unable to align itself to the edge of the opening because the edge is normally not straight, and an uncovered gap may be created between the edge of the window and the pull rod. For instance, if such a gap is present between the upper edge of the rear windshield of a motor vehicle and the pull rod of a roller shade intended for covering the rear windshield, direct sunlight passing through this gap may penetrate deep into the passenger compartment, thereby substantially diminishing the usefulness of the sun shade.

BRIEF SUMMARY OF THE INVENTION

In view of such problems of the prior art, a primary object of the present invention is to provide a roller shade for covering a designated area with a screen sheet having a pull rod attached to leading edge thereof which is capable of closely covering the edge of the designated area adjacent to the pull rod when the screen sheet is substantially fully extended.

A second object of the present invention is to provide a roller shade which is capable of effectively covering a designated area bordered by a three-dimensionally curved frame without requiring any highly complicated structure.

These and other objects of the present invention can be accomplished by providing a roller shade for selectively covering a designated area, comprising: a retractor mounted on a first side of the area that is to be covered; a screen sheet retracted in the retractor and being connected to the retractor at one end thereof; a pull rod attached to the other end of the screen sheet and moveable between a first position adjacent the retractor a second position adjacent a second side of the designated area opposing the first side; guide means for guiding movement of the pull rod between the first position and the second position; drive means for actuating the pull rod between the first position and the second position; and bending means for bending the pull rod at the second position so as to make the pull rod conform to the second side of the area.

Thus, when the screen sheet is fully extended, since the pull rod is curved or bent so as to conform to the adjacent edge of the designated area, the designated area may be fully covered by the screen sheet without leaving any uncovered gap between the pull rod and the corresponding edge of the designated area.

Such a bending deformation of the pull rod can be produced either by applying an axial compressive force to the pull rod or by applying a lateral force to a middle part of the pull rod at the second position. Alternatively, by using suitable cam means, it is possible to applying a bending moment at each end of the pull rod at the second position to cause a bending deformation thereto.

To the end of producing such an axial compressive force, the guide means may comprise a pair of guide members fixedly mounted each on either lateral side of the area, and a distance between the sliders each on either end of the pull rod is made substantially smaller at the second side than at the first side, the means for applying an axial compressive force to the pull rod at the second position thus consisting of the combination of the guide members and the sliders guiding the movement of the pull rod. For the purpose of controlling the direction of the bending deformation of the pull rod, each end of the pull rod may be offset from a central axial line of the pull rod, the pull rod may be provided with an initial curvature, or each end of the pull rod may be obliquely attached to the corresponding slider.

To the end of applying such a lateral bending force to the pull rod, it is possible to use a member having a slope on which a middle part of the pull rod rides over as the pull rod approaches the second position. Preferably, the slop may be provided with a notch for securing the pull rod at the second position.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
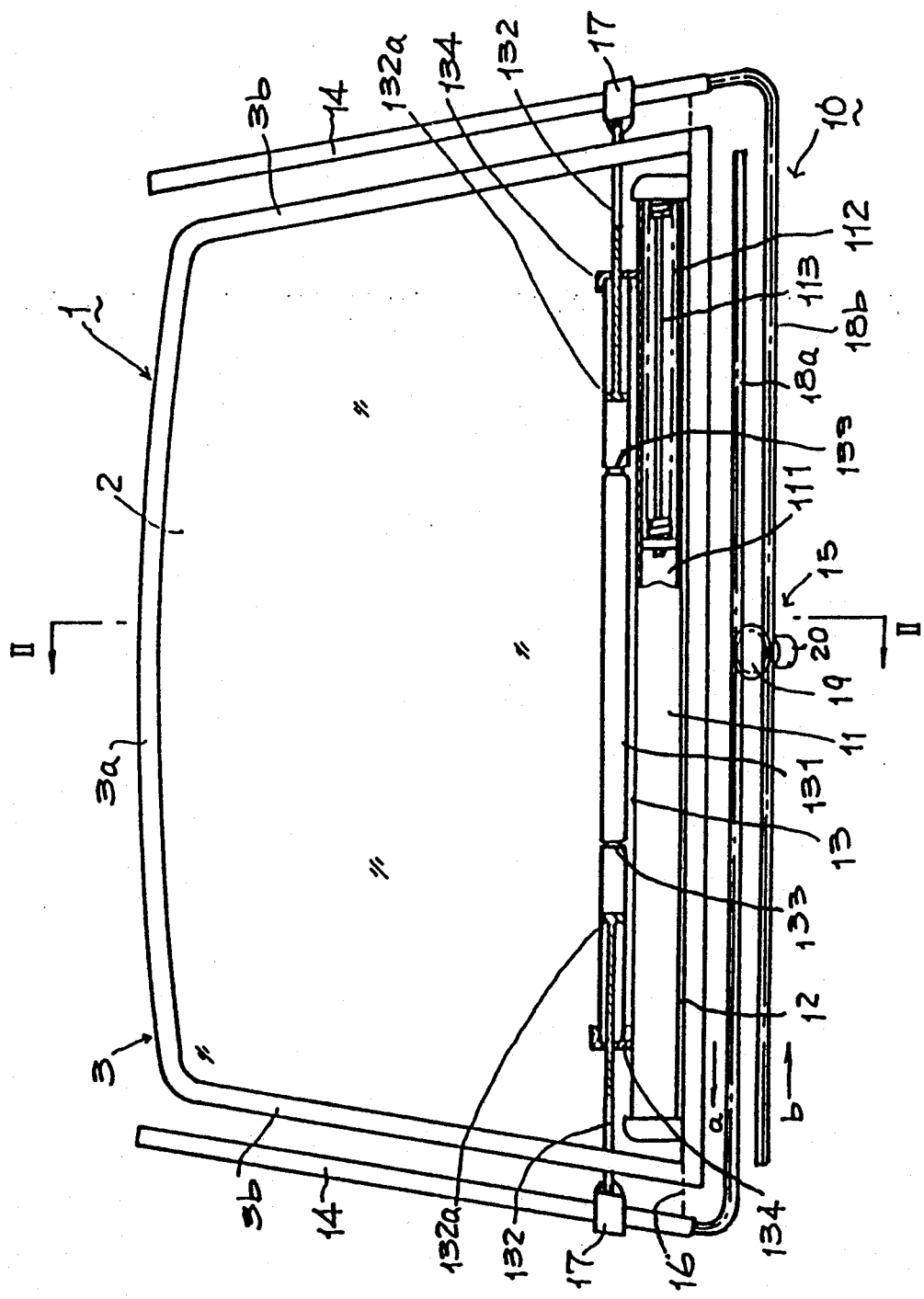
FIG. 1 is a view of a rear windshield of an automobile incorporated with a first embodiment of the roller shade according to the present invention as seen from the rear of the automobile.
Figure 2:
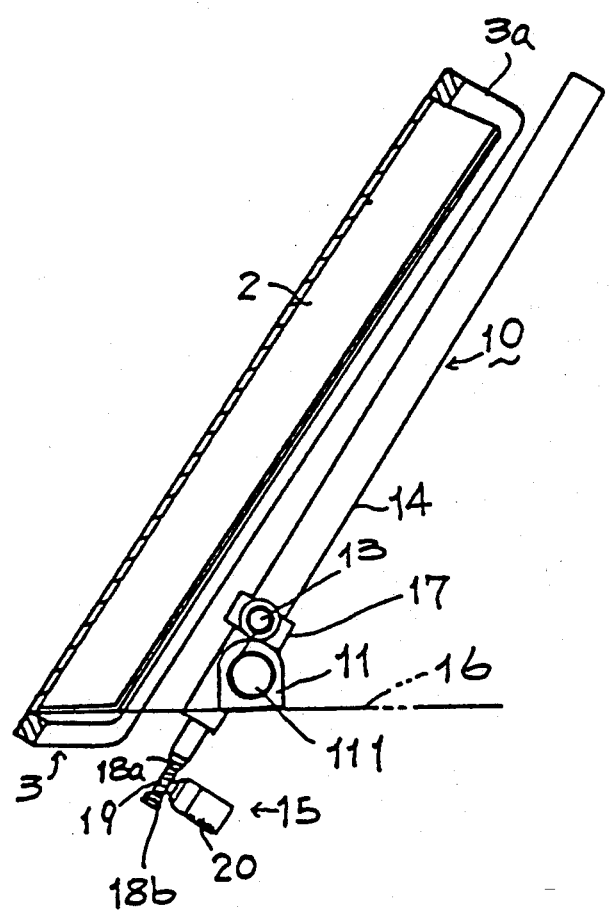
FIG. 2 is a sectional view taken along line II—II of FIG. 1.

FIGS. 1 and 2 show a rear windshield of an automobile as seen from the rear thereof. This rear wind shield 1 comprises a glass sheet 2 which is curved so as to be convex as seen from the rear of the automobile, and a frame 3 which supports the periphery of the glass sheet 2 and secures it to the vehicle body. The rear windshield 1 is generally trapezoidal in shape, and its upper edge 3a is curved in a complex manner so as to conform to the rounded rear end of the automotive roof. In the present embodiment, the upper edge 3a of the rear windshield 1 is convex towards the rear of the vehicle.

Numeral 10 generally denotes a first embodiment of the roller shade according to the present invention which is adapted to the rear windshield. The roller shade 10 comprises a spring loaded retractor 11, a screen sheet 12 which may be rolled onto the retractor 11, a pull rod 13 secured to a leading edge of the screen sheet 11, a pair of tubular guide members 14 for guiding the two ends of the pull rod 13 along vertical paths, and drive means 15 for vertically moving the pull rod 13.

The retractor 11 comprises a winding drum 111 and a torsion spring 112 which rotatively urges the winding drum 111 around a winding shaft 113, and this retractor 11 is fixedly mounted on a parcel board 16.

The screen sheet 12 may consist of mesh, perforated fabric, semi-transparent film, or other opaque, or semi-transparent material, and its trailing edge is fixedly secured to the winding drum 111 so that the screen sheet 112 may be wound around the winding drum 111 under the spring force of the torsion spring 112.

The pull rod 13 comprises a tubular main body 131, and a pair of rods 132 each telescopically received in either end of the tubular main body 131. The tubular main body 131 is provided with a pair of constricted parts 133 some distance away from the corresponding extreme ends, and the inner end 132a of each of the rods 132 is provided with an outer diameter which allows it to be slidably received inside the tubular main body 131 but prevents it from passing inwardly through the constricted part 133 and outwardly from a cap 134 securely fitted onto the corresponding end of the tubular main body 131. Thus, the inner end of each of the rods 132 is allowed to freely slide between the corresponding constricted part 133 and cap 134. While the inner end is thus slidably disposed inside the tubular main body 133, the outer end of each of the rods 132 projects out of the tubular main body 131 through the cap 134.

The guide members 14 are secured to the vehicle body so as to extend in parallel with and outwardly of the corresponding side edges 3b of the window frame 3. A slider 17 pivotally attached to each outer end of each of the rods 132 is slidably mounted on each of the guide members 14, and the vertical movement of the pull rod 13 is thus guided by the guide members 14 via the sliders 17.

The drive means 15 comprises a pair of flexible rack members 18a and 18b, a pinion 19 meshing with these rack members 18a and 18b, and a motor 20 which drives the pinion 19. One of the flexible rack members 18a is passed into one of the guide members 14 while the other flexible rack member 18b is passed into the other guide member 14, and the inner end of each of the flexible rack members 18a and 18b inside the corresponding guide member 14 is connected to the corresponding slider 17 in such a manner that the rotation of the pinion 19 may cause the movements of the flexible rack members 18a and 18b in the directions indicated by a and b, respectively, and the reverse rotation of the pinion 19 may likewise reverse the movements of the flexible rack members 18a and 18b.

The roller shade constructed as described above operates as given in the following.

The roller shade 10 in FIGS. 1 and 2 is in its inoperative state; the screen sheet 12 is retracted and rolled up onto the retractor 11, and the pull rod 13 is at its lower most position. Therefore, the rear window 1 is totally open without being covered by the screen sheet 12.

When the drive means 15 is actuated so as to move the flexible rack members 18a and 18b in directions a and b, respectively, from this open state, the pull rod 13 is moved upward by way of the sliders 17.

Figure 3:
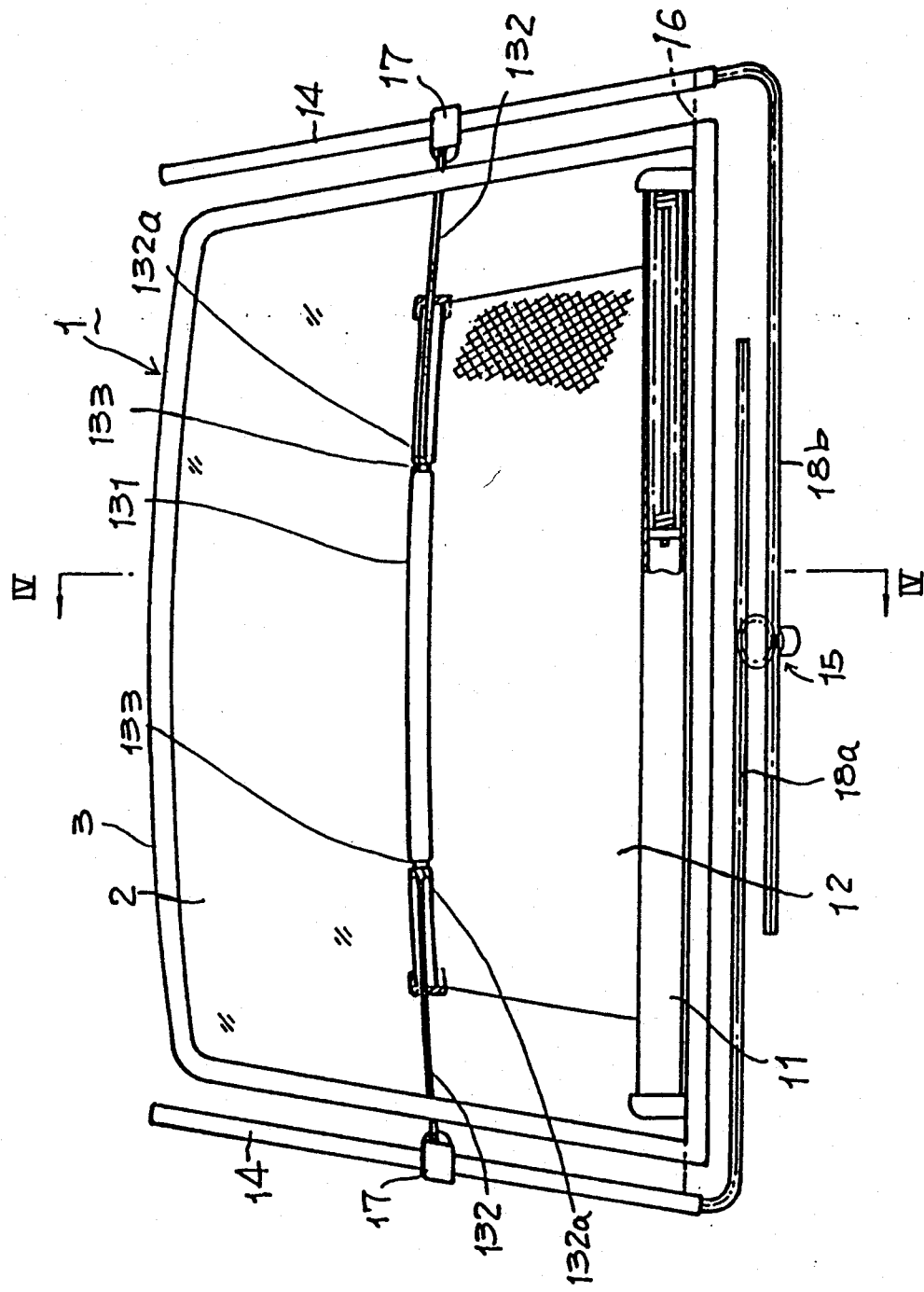
FIG. 3 is a view similar to FIG. 1 showing the pull rod being moved half-way up the rear windshield.
Figure 4:
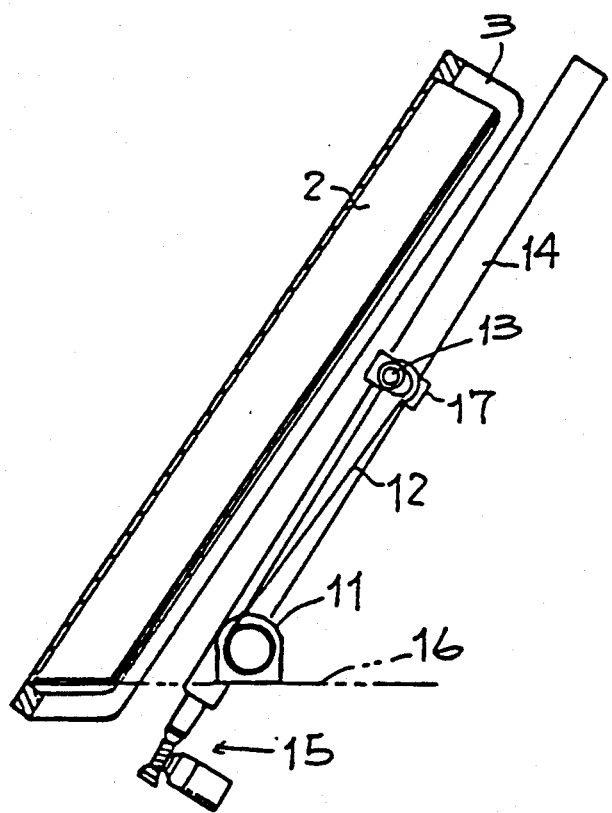
FIG. 4 is a sectional view taken along line IV—IV of FIG. 3.

FIGS. 3 and 4 show the state in which the pull rod 13 is being moved upward, and the screen sheet 11 is paid out from the retractor 11. Since the lateral distance between the two guide members 14 diminishes as the pull rod 13 is moved upward, the overall length of the pull rod 13 is accordingly reduced by the rods 132 being pushed into the tubular main body 131. The length of the pull rod 13 may be reduced until the inner end 132a of each of the rods 132 reaches the constricted part 133 of the tubular main body 131.

Figure 5:
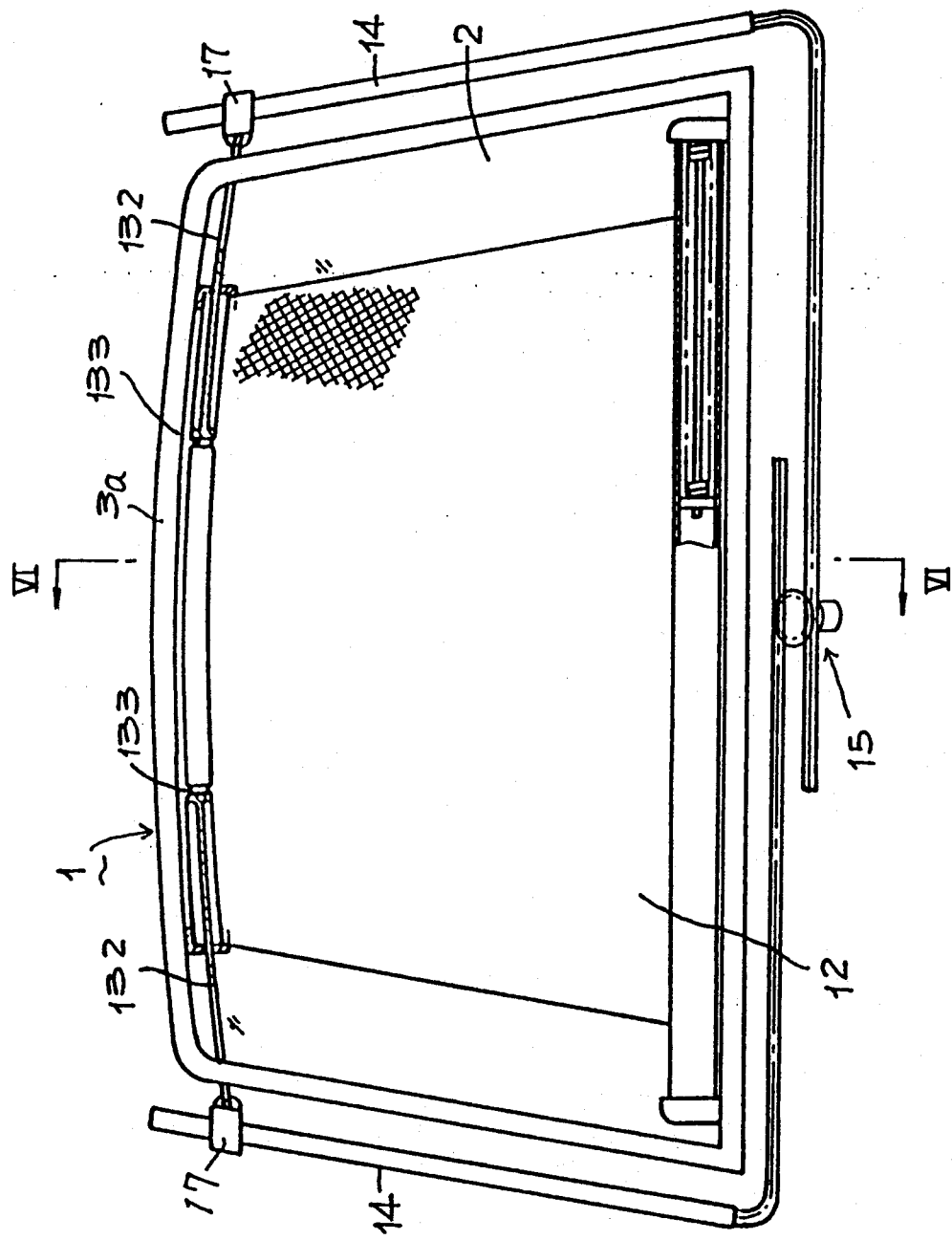
FIG. 5 is a view similar to FIG. 1 showing the pull rod moved all the way up to the upper edge of the rear windshield.
Figure 6:
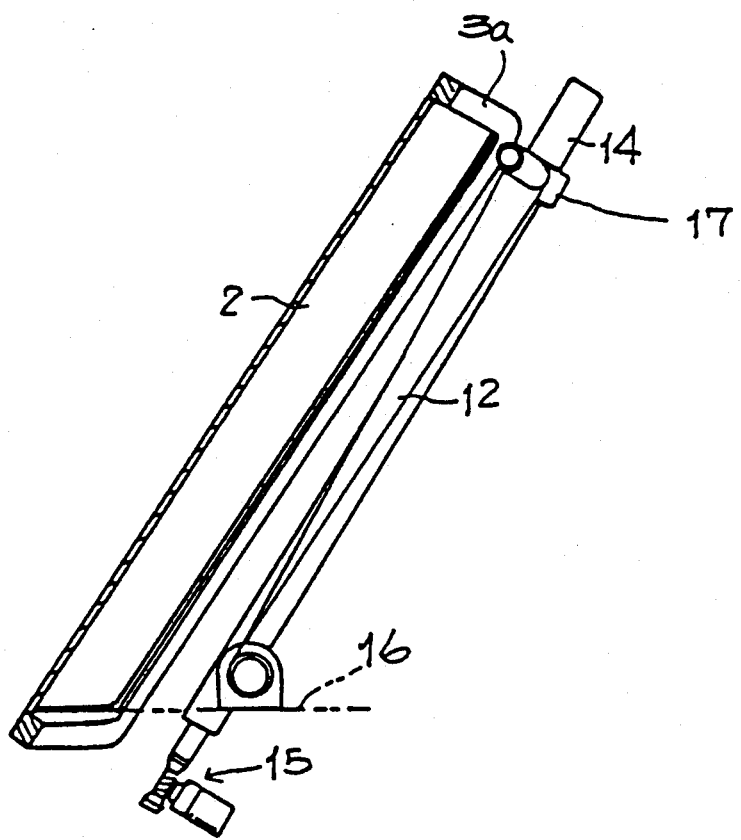
FIG. 6 is a sectional view taken along line VI—VI of FIG. 5.

When the pull rod 13 is moved further upward, and the lateral distance between the two guide members 14 is further reduced, the pressure of the rods 132 acting upon the constricted parts 133 increases, and, eventually, the pull rod 13 is buckled and bent in such a manner that the middle part of the pull rod 13 protrudes toward the window glass sheet 2. As a result of this bending deformation of the pull rod 13, the pull rod 13 is aligned with the upper edge 3a of the window frame 3 at its upper most position, and there will be substantially no gap between the upper edge 3a of the window frame 3 and the pull rod 13 as illustrated in FIGS. 5 and 6.

To the end of controlling the bending deformation of the pull rod 13 at its upper most position, the pull rod 13 may be provided with a slight curvature in its normal condition because a buckling deformation has a strong tendency to occur in the direction to increase such an initial curvature.

FIGS. 7 through 10 show a second embodiment of the roller screen 30 according to the present invention. Because the second embodiment is similar to the first embodiment except for the structure of its pull rod 31, other parts of the second embodiment are therefore denoted with like numerals and are not described again.

The pull rod 31 comprises a tubular main body 32, and a pair of rods 33 each integrally connected to an end of the tubular main body 33 at one end thereof, and the other end of each of the rods 33 is pivotally attached to a slider 17 slidably mounted on the corresponding guide member 14.

Figure 11:
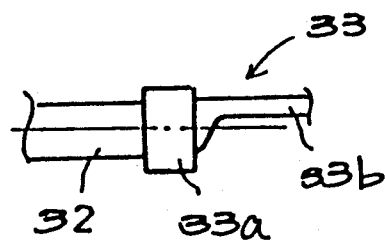
FIG. 11 is a fragmentary view of a part of the pull rod.

As illustrated in FIG. 11, each of the rods 33 consists of a cap member 33a fitted on the corresponding end of the tubular main body 32, and a stem member 33b integrally and eccentrically attached to the cap member 33a. The stem member 33b is offset toward the interior of the passenger compartment with respect to the center of the cap member 33a or the tubular maim body 32 for facilitating the curving of the pull rod 31 by applying thereto an axial force produced by the reduction in the lateral distance between the two sliders 17.

Figure 7:
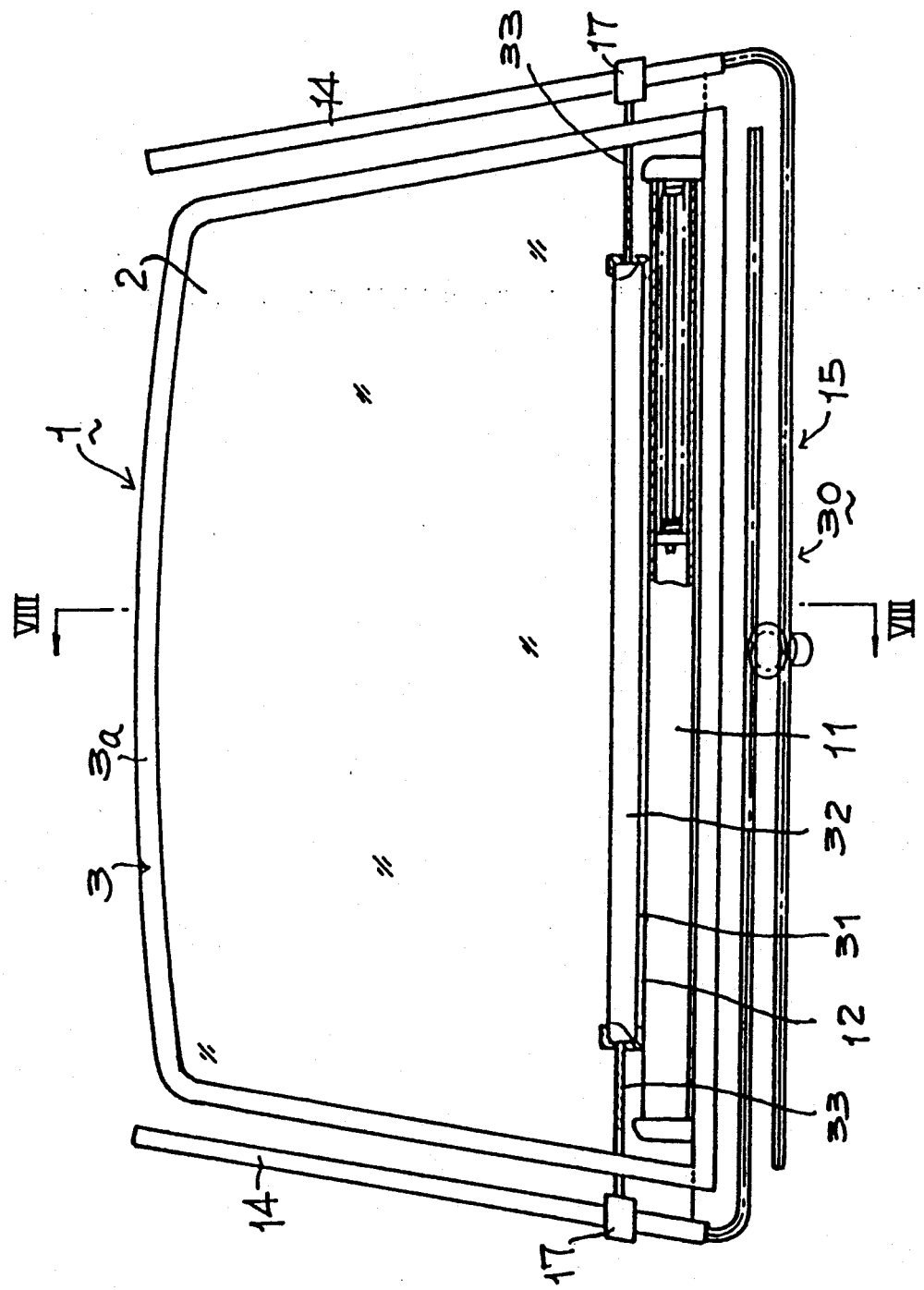
FIG. 7 is a view similar to FIG. 1 showing a second embodiment of the present invention.
Figure 8:
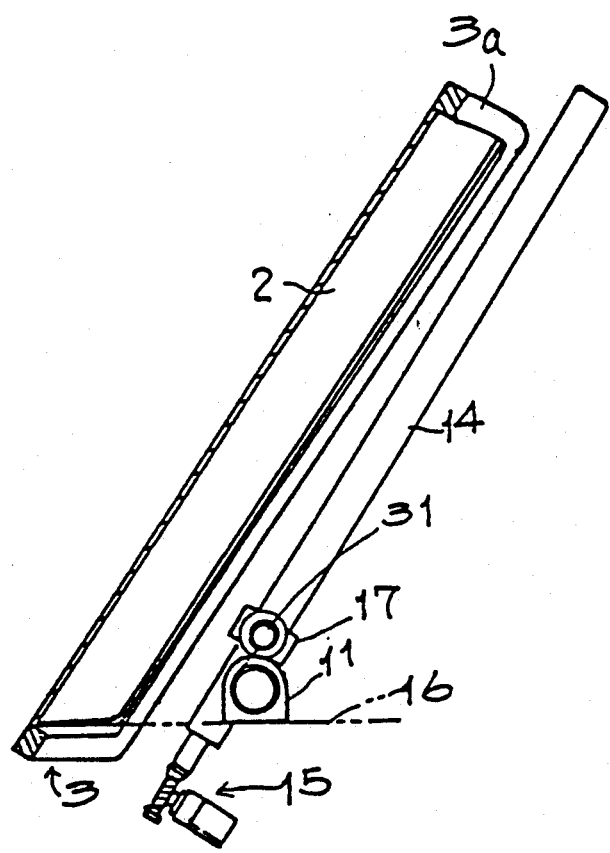
FIG. 8 is a sectional view taken along line VIII—VIII of FIG. 7.

According to this roller shade device 30, as the pull rod 31 is moved upward from its inoperative state illustrated in FIGS. 7 and 8 by the drive means 15, the screen sheet 12 is paid out from the retractor 11 and covers the rear window 1 substantially in the same way as in the previous embodiment.

Figure 9:
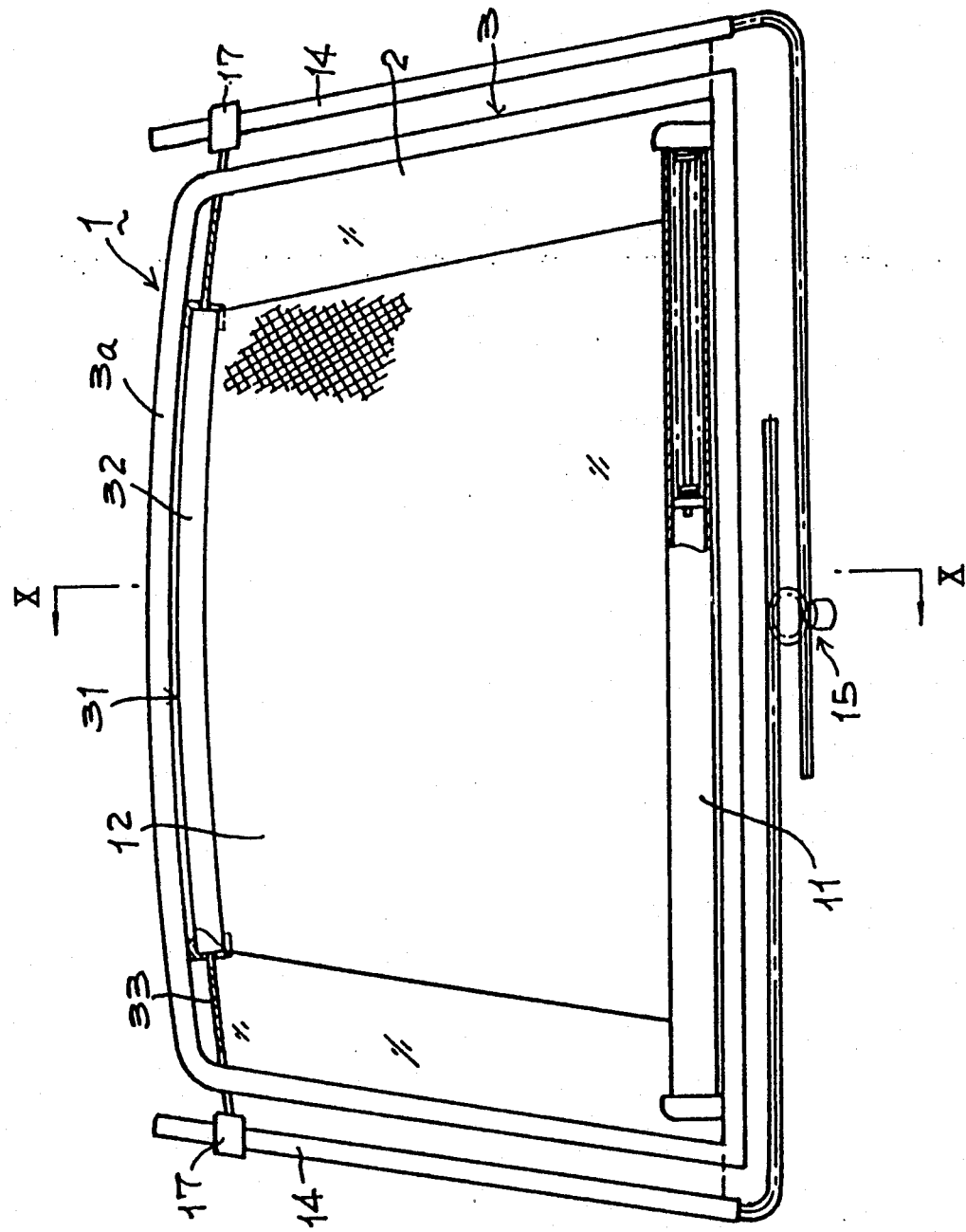
FIG. 9 is a view similar to FIG. 7 showing the pull rod moved all the way up to the upper edge of the rear windshield.
Figure 10:
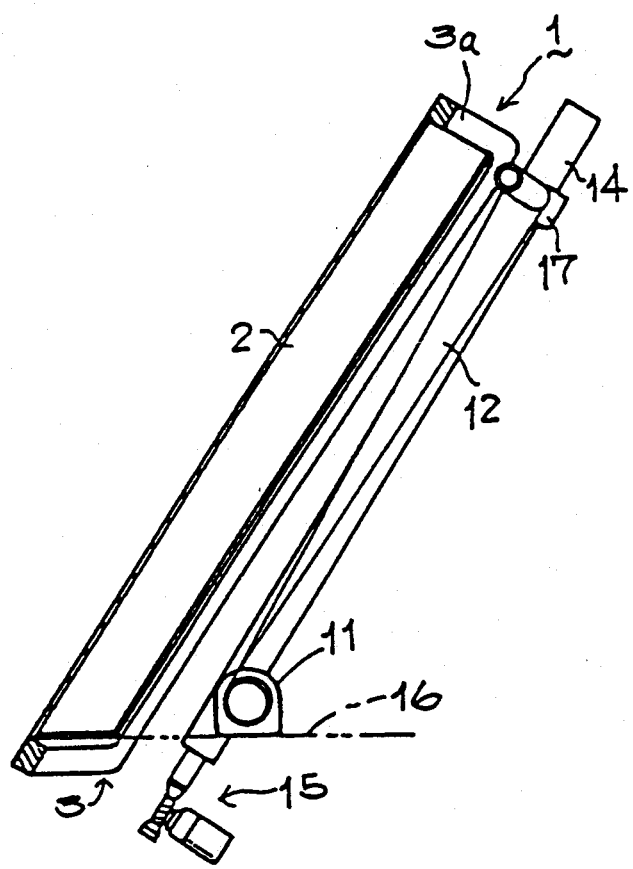
FIG. 10 is a sectional view taken along line X—X of FIG. 9.

Since the rods 33 of the pull rods 31 are fixedly secured to the tubular main body 32, the pull rod 31 cannot change its length, the axial force acting on the tubular main body 32 via the rods 33 progressively increases as the pull rod 31 is moved upward, and the distance between the sliders 17 guided by the guide members 14 diminishes. Eventually, the pull rod 31 is fully curved at its upper most position with its convex side facing the window glass sheet 2. Thus, the pull rod 31 can favorably conform to the upper edge 3a of the window frame 3 when the pull rod 31 is at its upper most position, and the screen sheet 12 can cover the upper part of the rear window 1 without leaving any uncovered gap as illustrated in FIGS. 9 and 10.

FIGS. 12 through 15 show a third embodiment of the roller shade according to the present invention. Because the third embodiment is similar to the first embodiment except for the structure of its pull rod 41 and the provision of bending means 4, other parts of the third embodiment are therefore denoted with like numerals and are not described again.

In this roller shade 40, the pull rod 41 consists of a tubular main body 42, and a pair of rods 43 slidably received by the respective ends of the tubular main body 42. The outer end of each of the rods 43 is attached to a slider 17 which is guided by a guide member 14 and actuated by drive means 15. The bending means 4 consists of a substantially triangular plate depending from the roof and having an oblique side 4a provided with a notch 5 for engaging with the tubular main body 42 of the pull rod 41.

Figure 12:
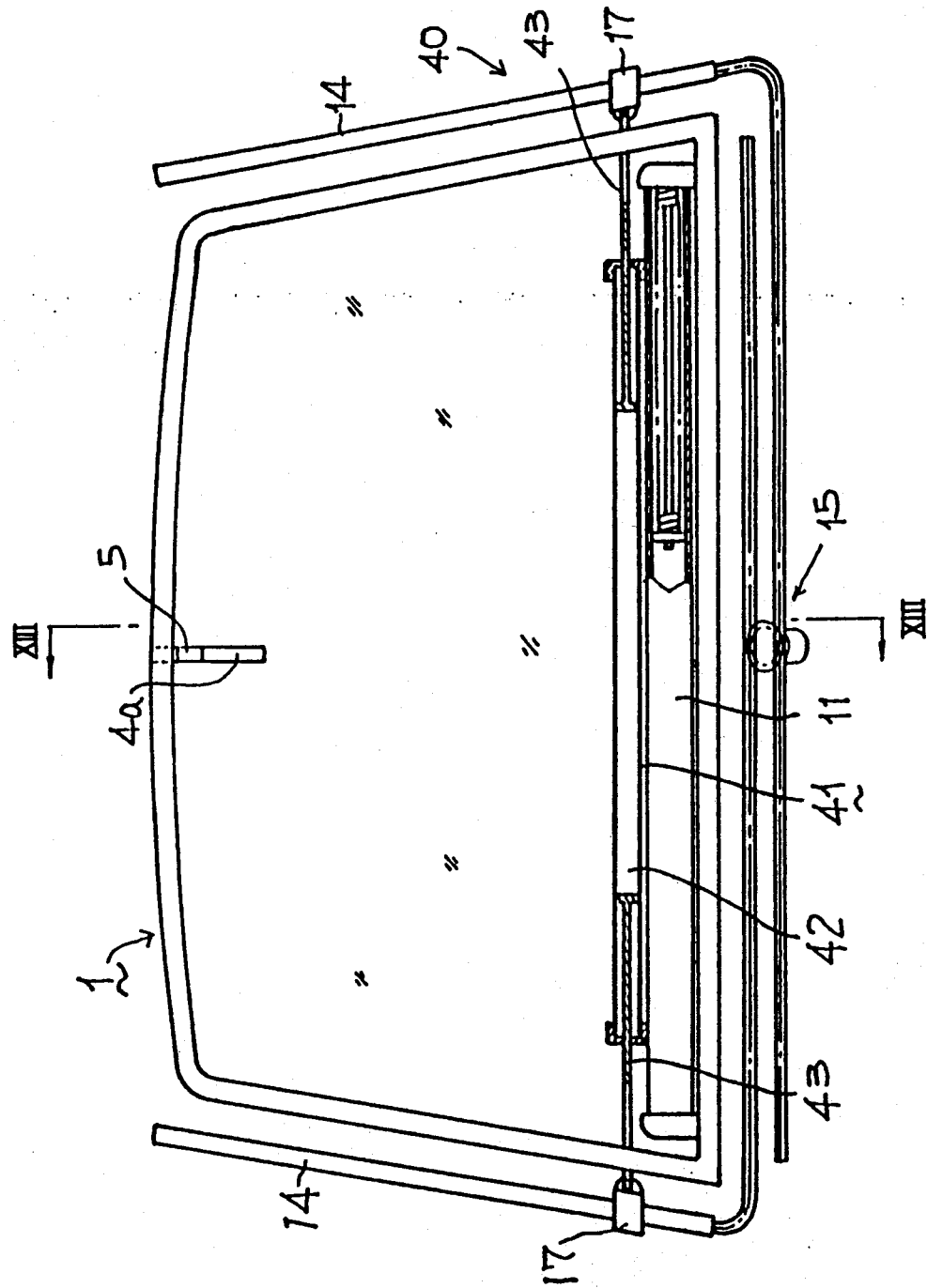
FIG. 12 is a view similar to FIG. 1 showing a third embodiment of the present invention.
Figure 13:
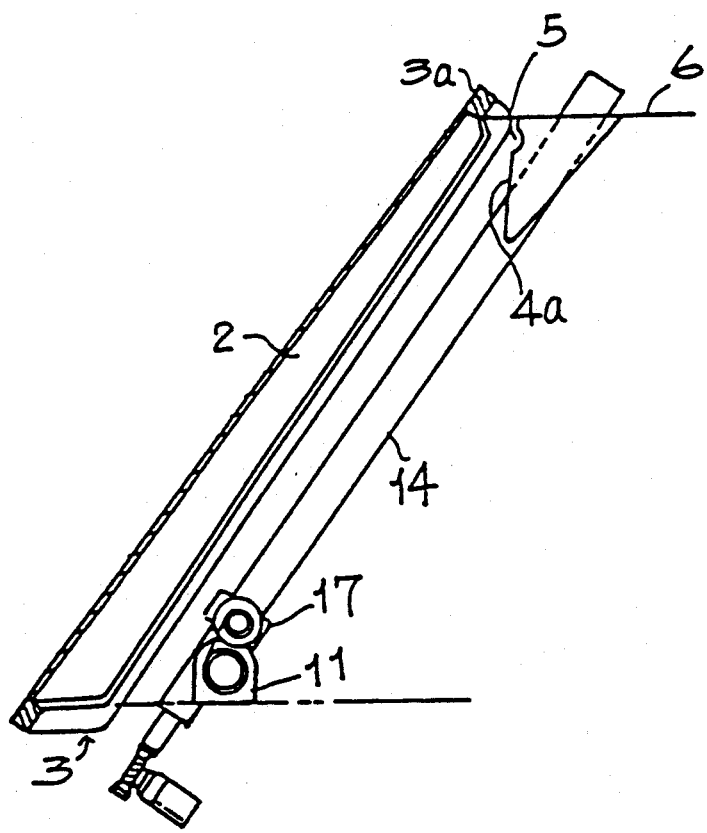
FIG. 13 is a sectional view taken along line XIII—XIII of FIG. 12.
Figure 14:
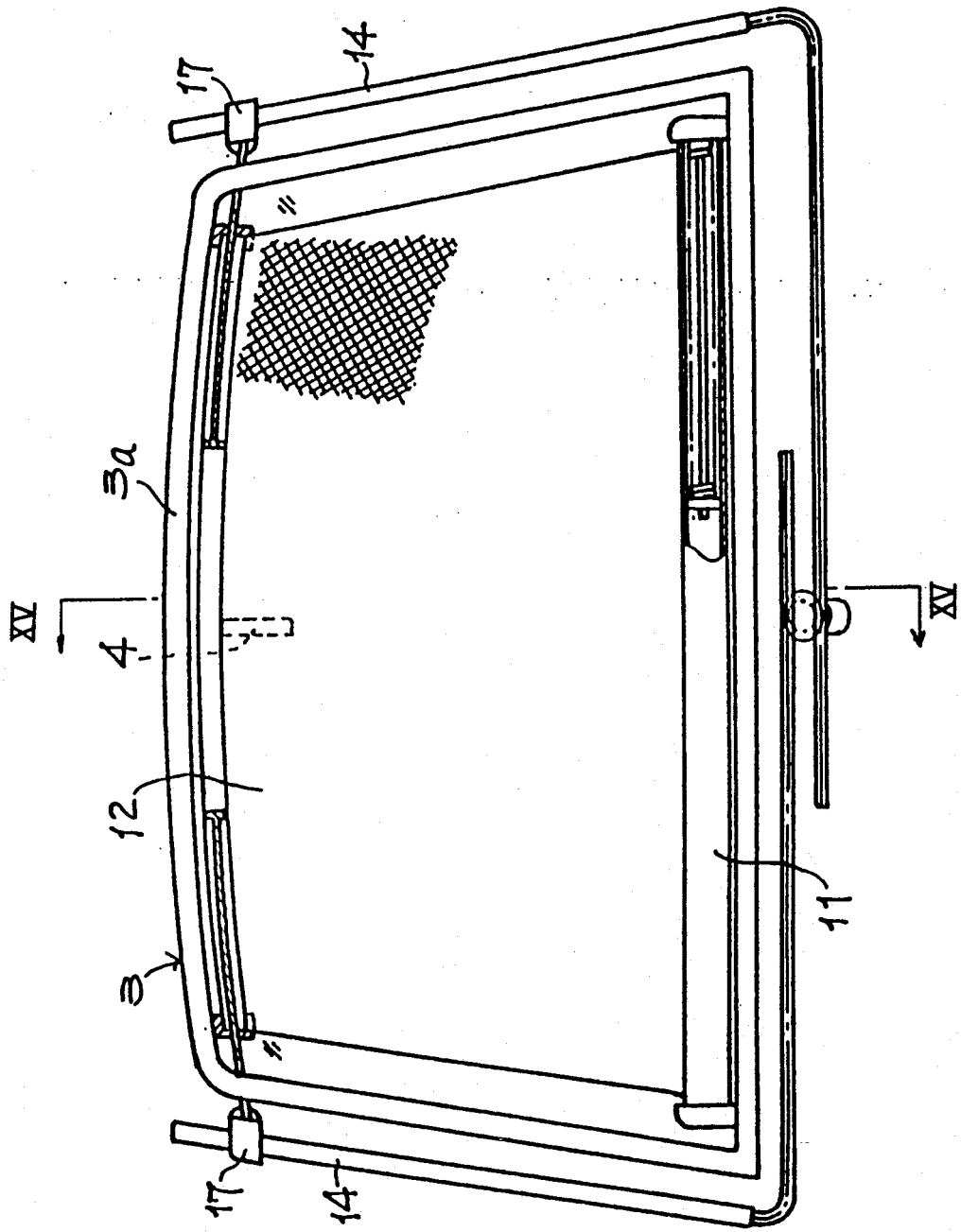
FIG. 14 s a view similar to FIG. 7 showing the pull rod moved all the way up the upper edge of the rear windshield.
Figure 15:
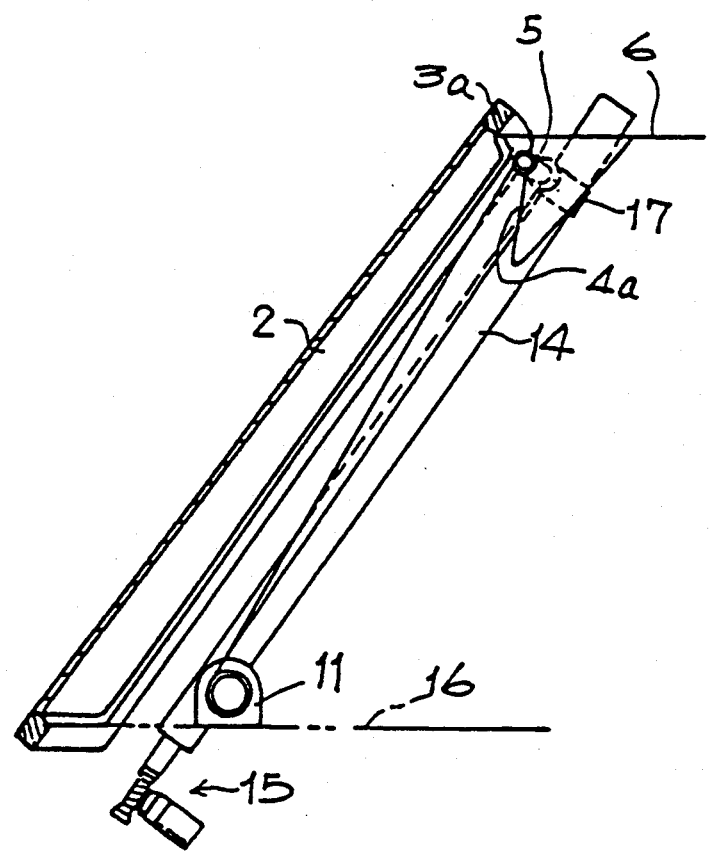
FIG. 15 is a sectional view taken along line XV—XV of FIG. 14.

According to this roller shade 40, as the pull rod 41 is moved upward from its position illustrated in FIGS. 11 and 12 by the drive means 15, the screen sheet 12 is paid out from the retractor 11, and covers the rear window 1 as illustrated in FIG. 14 and 15.

As the pull rod 41 is moved upward, and the distance between the two sliders 17 guided by the guide members 14 decreases, the rods 43 are pushed into the tubular main body 42, and the overall length of the pull rod 41 decreases. When the pull rod 41 reaches near it upper most position, the tubular main body 42 slides over the oblique side 4a of the bending means 4 thereby increasing the curvature of the tubular main body 42, and, as the pull rod 41 is further moved upward, is eventually engaged by the notch 5 with the pull rod 41 in its fully curved state. The pull rod 41 in its fully curved state substantially conforms to the upper edge 3a of the window frame 3, and the screen sheet 12 can cover the rear window 1 without leaving any uncovered gap therebetween as illustrated in FIGS. 14 and 15.

Exposing the rear window 1 can be accomplished by reversing the drive means 15 and lowering the pull rod 41 thereby allowing the screen sheet 12 to be rolled up onto the spring-loaded retractor 11.

Figure 16:
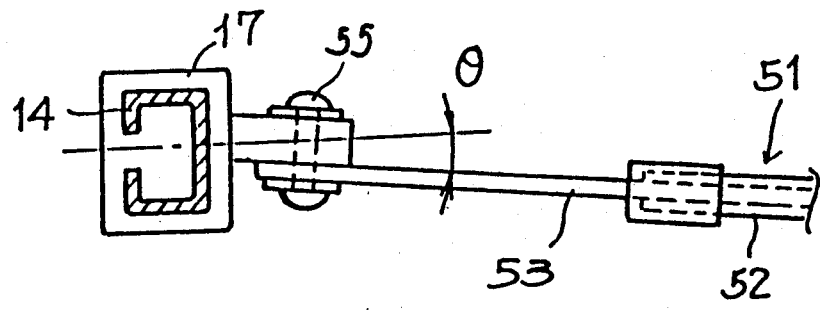
FIG. 16 is a fragmentary sectional plan view of a slider end of the pull rod.

FIG. 16 shows the structure for connecting the slider 17 with the pull rod 51 so as to allow the pull rod 51 to be curved with its convex side facing the rear window. In this embodiment, the pull rod 51 consists of a tubular main body 52, and a pair of rods 53 fixedly secured to the respective ends of the tubular main body 52. The other end of each of the rods 53 is pivotally attached to the corresponding slider 17 so as to be rotatable around a pin 55 extending substantially perpendicularly to the rear windshield 1 and to form an angle $\theta$ from a horizontal line toward the rear windshield. Thus, as the pull rod 51 is moved upward, and the distance between the two sliders 17 is reduced, the pull rod 51 is subjected to an axial force which causes a bending moment in the pull rod 51. The angle $\theta$ which is formed at each end of the pull rod 51 with a horizontal line toward the rear window ensures the direction and the magnitude of the curvature of the bending deformation of the pull rod 51. Thus, the pull rod 51 at its upper most position can favorably conform to the upper edge of the window glass.

The above described embodiments were directed to the applications in the roller shades for the rear window or an automobile, but the present invention is not limited by these embodiments, and can be equally applied to the windows of buildings, luggage compartments of vehicles, and other areas having irregularly shaped borders.

What we claim is:

1. A roller shade for selectively covering a designated area, comprising:
    a retractor mounted on a first side of said area that is to be covered;

a screen sheet retracted in said retractor and being connected to said retractor at one end thereof;

a pull rod attached to the other end of said screen sheet and moveable between a first position adjacent said retractor and a second position adjacent a second side of said designated area opposing said first side;

guide means for guiding movement of said pull rod between said first position and said second position;

drive means for actuating said pull rod between said first position and said second position; and bending means for bending said pull rod at said second position so as to make said pull rod conform to said second side of said area.

2. A roller shade according to claim 1, wherein said bending means consists of means for applying an axial compressive force to said pull rod at said second position.

3. A roller shade according to claim 2, wherein said guide means comprises a pair of guide members fixedly mounted each on either lateral side of said area, and a distance between said sliders each on either end of said pull rod is substantially smaller at said second side than at said first side, said means for applying an axial compressive force to said pull rod at said second position thus consisting of the combination of said guide members and said sliders guiding the movement of said pull rod.

4. A roller shade according to claim 3, wherein each end of said pull rod is offset from a central axial line of said pull rod so that the pull rod may be bent in a desired direction at said second position.

5. A roller shade according to claim 3, wherein said pull rod is provided with an initial curvature so that the pull rod may be bent in a desired direction at said second position.

6. A roller shade according to claim 3, wherein each end of said pull rod is obliquely attached to the corresponding slider so that the pull rod may be bent in a desired direction at said second position.

7. A roller shade according to claim 1, wherein said bending means consists of means for applying a lateral force to a middle part of said pull rod at said second position.

8. A roller shade according to claim 7, wherein said means for applying a lateral force to a middle part of said pull rod at said second position consists of a member having a slope on which a middle part of said pull rod rides over as said pull rod approaches said second position.

9. A roller shade according to claim 8, wherein said slope is provided with a notch for securing said pull rod at said second position.

* * * * *